United States Patent
Guo et al.

(10) Patent No.: US 8,504,236 B2
(45) Date of Patent: Aug. 6, 2013

(54) PROACTIVE LOW FUEL WARNING SYSTEM AND METHOD

(75) Inventors: Youliang Guo, Barrington, IL (US); Christina Wang, Lake Zurich, IL (US); Jonathan Lasch, Northbrook, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 298 days.

(21) Appl. No.: 13/013,119

(22) Filed: Jan. 25, 2011

(65) Prior Publication Data
US 2012/0191289 A1    Jul. 26, 2012

(51) Int. Cl.
- *G01C 21/34* (2006.01)
- *B65B 1/30* (2006.01)
- *G06F 19/00* (2006.01)

(52) U.S. Cl.
USPC ........ 701/29.1; 701/123; 701/409; 340/450.2

(58) Field of Classification Search
USPC ............. 701/29.1, 123, 32.3, 32.4, 32.5, 431, 701/409, 5; 340/450.2, 457
See application file for complete search history.

(56) References Cited

U.S. PATENT DOCUMENTS

| | | | | |
|---|---|---|---|---|
| 6,459,967 | B1 * | 10/2002 | Otto | 701/29.1 |
| 6,691,025 | B2 * | 2/2004 | Reimer | 701/123 |
| 7,492,284 | B2 * | 2/2009 | Suzuki | 340/995.27 |
| 7,668,644 | B2 * | 2/2010 | Tengler et al. | 701/123 |
| 7,726,360 | B2 * | 6/2010 | Sato et al. | 141/94 |
| 7,818,122 | B2 * | 10/2010 | Tobiyama et al. | 701/426 |
| 8,280,619 | B2 * | 10/2012 | Watkins | 701/123 |
| 2004/0128067 | A1 | 7/2004 | Smith | |
| 2009/0157289 | A1 * | 6/2009 | Graessley | 701/123 |
| 2012/0098676 | A1 * | 4/2012 | Oizumi et al. | 340/901 |

* cited by examiner

*Primary Examiner* — Tan Q Nguyen

(57) ABSTRACT

A proactive low-fuel warning system provides notifications to a vehicle operator that the energy or fuel remaining in a fuel supply or energy storage device is insufficient to reach a fueling station. When fuel level is too low or the energy stored in a batter is insufficient, the system can be configured to inhibit vehicle operation. Emergency communications can be sent automatically when fuel is depleted, nearly depleted with inclusion of location information by which the vehicles current location can be determined by emergency service providers.

23 Claims, 2 Drawing Sheets

PROACTIVE LOW FUEL WARNING SYSTEM AND METHOD

BACKGROUND

Automobiles, trucks and motorcycles, all of which are considered herein to be motor vehicles, have fuel-level indicators that provide a visual representation or indication of the amount of fuel remaining in the vehicles' fuel tank. Cautious drivers tend to keep fuel tanks filled in order to avoid running out of fuel. Other drivers sometimes ignore low-fuel-level indicators and even low fuel warnings. Drives that tend to ignore fuel level indicators sometimes find themselves stranded on a roadside after running out of fuel.

DETAILED DESCRIPTION

Figure 1:
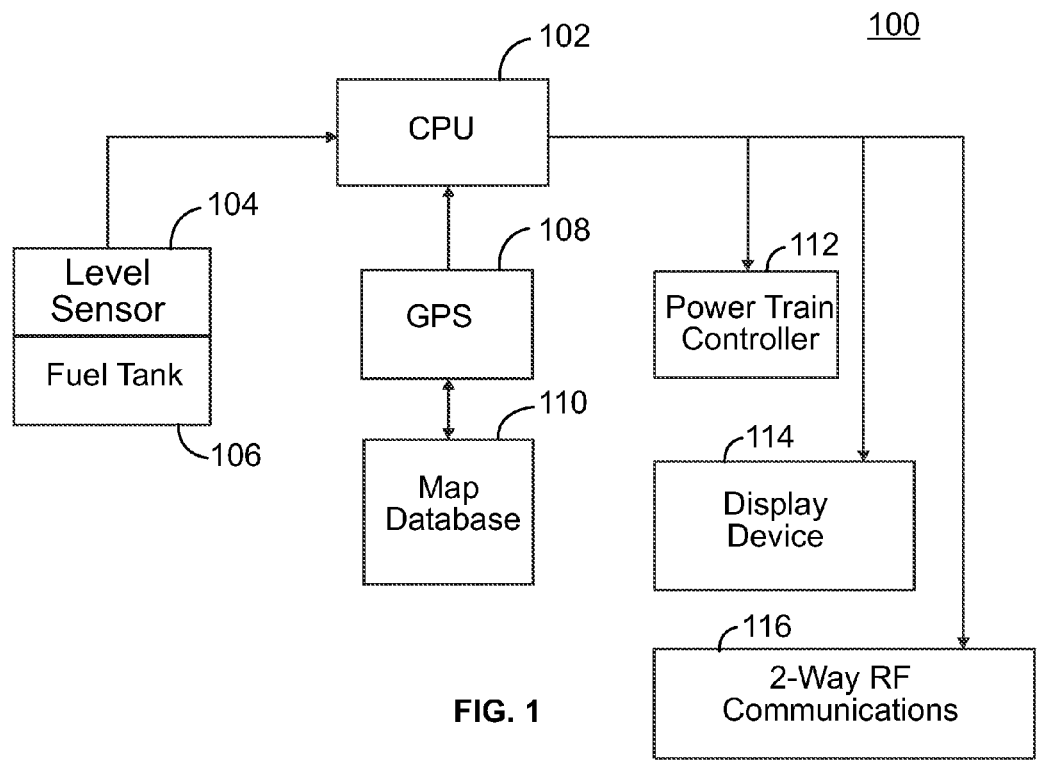
FIG. 1 is block diagram of pro-active low-fuel warning system.

A low-fuel warning system that proactively warns of a low fuel condition, and determines whether sufficient fuel remains to reach a destination or fuel station would be an improvement over the prior art. FIG. 1 is block diagram of a low-fuel warning system 100 for use with automobiles, trucks and other motor vehicles. The system is usable with vehicles that are powered by fuels that are liquid or gaseous. With minor modification, the system is also useable with battery-powered vehicles.

Figure 3:
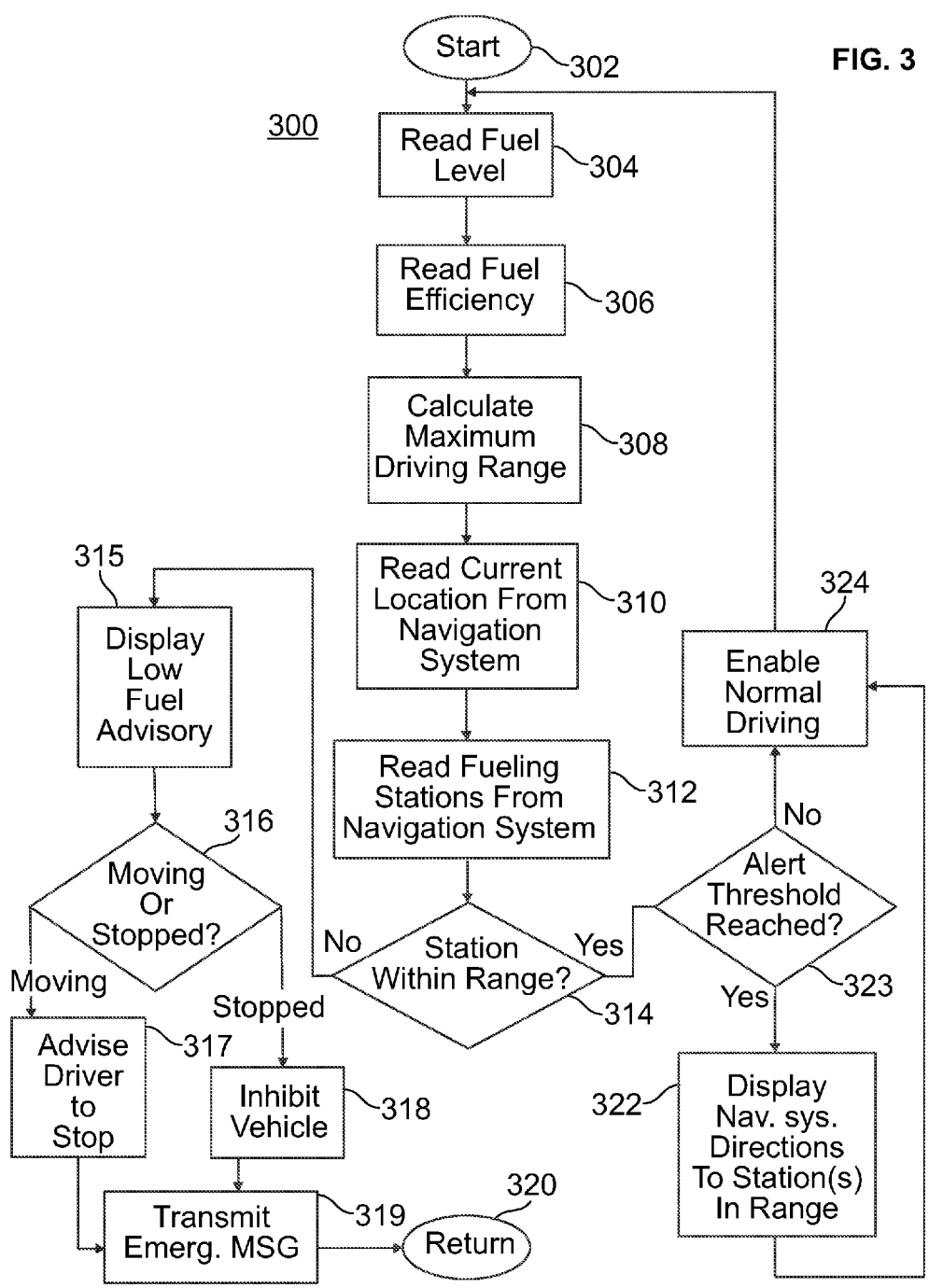
FIG. 3 is a flow chart depicting steps of a pro-active low fuel warning method.

The system 100 is comprised of a central processing unit (CPU) or computer 102 that executes computer program instructions stored in a memory device coupled to the CPU 102. In one embodiment the CPU 102 is a single chip microcontroller having serial and parallel input/output devices, analog-to-digital and digital-to-analog converters on the die. The microcontroller also has its own program memory on the die, which stores program instructions and data. Executable program instructions stored in the memory cause the processor to perform various functions described below and which are depicted in FIG. 3. External memory devices usable with a microcontroller or other form of CPU 102 are well-known in the computer art and omitted from FIG. 1 for clarity purposes.

The CPU 102 is operatively coupled to an electronic fuel level sensor 104 that measures the amount of fuel in a fuel storage vessel, commonly referred to as a tank 106 and which is attached to a vehicle. The vehicle is not shown in FIG. 1 for clarity purposes.

Fuel level sensors 104 are well-known. They typically output voltage representative of the amount of liquid fuel remaining in the tank 106. In another alternate embodiment, a load cell is used to determine the weight of a fuel tank including the fuel stored therein. In embodiments where the system 100 is used with gaseous fuels, the sensor 104 is configured to measure one or more of the tank pressure, tank temperature and the weight of fuel in the tank. In embodiments of the system 100 used with battery powered vehicles, the sensor 104 measures the remaining battery capacity. Regardless of the type of fuel sensor 104 used with a motor vehicle, a signal is provided by the fuel sensor 104, which represents the amount of fuel or battery capacity available to the vehicle's drive train.

In addition a fuel sensor 104, a navigation system 108 is also coupled to the CPU 102. The navigation system 108 is preferably embodied as a global positioning system that is also coupled to a map database 110. The map database 110 includes a list of fueling stations for the vehicle and their locations.

Global positioning system or GPS navigation systems with databases that include fueling station locations are well-known in the art and commercially available from Garmin International, Inc., located at 1200 E. 151st Street, Olathe, Kans. 66062-342 and TomTom Inc. 150 Baker Ave. Concord, Mass. 01742. LORAN and inertial guidance systems are two more types of prior art navigation systems that can be used with the system and method disclosed herein.

LORAN stands for long range navigation. It is a well-known prior art terrestrial radio navigation system that uses low frequency radio signals emitted from multiple transmitters in order to determine the location and speed of a receiver. Inertial navigation systems are also well-known prior art navigation systems. Inertial navigation systems use one or more computers, accelerometers and gyroscopes to calculate, via dead reckoning, a position, orientation, speed and direction of a vehicle. Since LORAN and inertial navigation systems can also be provided with fueling station databases, the term, "navigation system" should be construed to include all three systems, namely GPS, LORAN and inertial guidance systems.

A power-train controller 112 is operatively coupled to the CPU 102. The power train controller 112 is typically embodied as an engine control unit or ECU which controls operation of the vehicles engine and fuel system. The power train controller determines one or both of the instantaneous or average fuel efficiency of the vehicle. In an alternate and equivalent embodiment, the functionality of the power train controller 112 is provided by the CPU 102 and vice-versa.

A proactive fuel warning function is provided by the CPU 102 determining how far the vehicle can travel on the fuel remaining in the tank. Once the vehicle range is determined, the system 100 is configurable to provide a warning to the vehicle operator, or inhibit operation of the vehicle, or transmit one or more messages via a wireless communications system or perform a combination of the operations.

Driving range is determined using the vehicle's fuel efficiency and the amount of fuel remaining in the tank 106. In liquid-fueled vehicles, driving range is determined by multiplying the vehicle's fuel efficiency by the fuel remaining in the tank. The fuel remaining in the tank 106 is conveyed to the CPU 102 from the fuel-level sensor 104. Fuel economy information is provided to the CPU 102 by the power-train controller 112.

Once the maximum driving range for the fuel remaining in the tank is determined, the CPU 102 queries the navigation system 108 for information as to the locations of fuel stations within the range provided by the remaining fuel. A display device 114, such as a liquid crystal display panel, is configured to receive information from the CPU 102 and to display thereon, a low-fuel-related message. For purposes of claim construction, low-fuel-related messages are not simply the display or illumination of an indicator when a fuel level drops below a threshold but are instead, substantive information-bearing messages. Low-fuel-related messages include, but are not limited to, the driving range provided by the fuel remaining in the fuel tank 106, driving practice such as a maximum speed required to reach a fueling station with the remaining fuel, a map route to nearby fueling stations, turn-by-turn directions, or an advisory that vehicle operation is inhibited or reduced due to a low fuel condition. An audible or visual alarm can also be provided to notify the driver that additional fuel is required to travel beyond the distance to the closest fueling station.

In another embodiment, the proactive low-fuel warning system is provided with a two-way radio frequency communications system 116, an example of which is the On-Star® the system available on various motor vehicles sold by the General Motors Corporation. In such an embodiment, the two-way radio frequency communication system 116 receives a message from the CPU 102 that directs the communications system 116 to transmit one or more messages to one or more pre-determined phone numbers regarding the vehicle's fuel status. An example of such a message is one wherein the vehicle has run-out of fuel, its driver is stranded and requires assistance. The transmitted information preferably includes information as to where the vehicle is located. Such information could be either latitude and longitudinal coordinates or an address, both of which are available from the map database 110.

In another embodiment, the two-way radio frequency communication system 116 is configured to transmit a message that a driver can select and determine. An example of this would be a phone call placed to a particular phone number or individual who the driver might know to be available to render assistance. In yet another embodiment, an emergency message can be transmitted when fuel in the tank 106 drops below a user-defined or a vehicle-manufacturer specified threshold. By way of example, an emergency message is transmitted when the amount of fuel in the tank 106 drops below some percentage of its value where no nearby fuel station can be reached.

In yet another embodiment, the CPU 102 is programmed to inhibit operation of the vehicle after determining that the remaining in the tank 106 is insufficient to reach the closest fueling station upon engine start up. A message can be displayed on a user interface display device 114 or transmitted via the communications system 116.

In the case where a vehicle is moving, CPU 102 will periodically check fuel level and nearby fuel stations in real time to determine that an Alert Threshold has been reached. If yes, a warning message will be displayed to alert the user to go to the nearest fuel station. In the case where the driver ignores the alert, and there is not a station nearby that can be reached, an alert requesting the user to park in a safe zone will be displayed.

Figure 2:
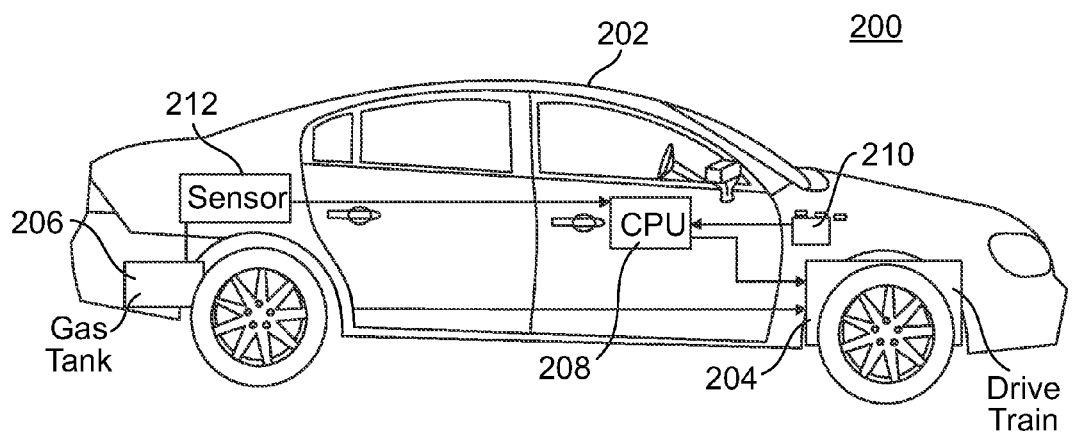
FIG. 2 is a block diagram of a motor vehicle comprised of a low-fuel warning system.

FIG. 2 is a block diagram of a motor vehicle 200 having the proactive low-fuel warning system depicted in FIG. 1 and described above. In this figure, the fuel level sensor 212 provides fuel level information that represents the amount of fuel in a gas tank 206. In battery-powered vehicles, the fuel level sensor 212 provides information on remaining battery capacity.

Fuel information is provided to a computer 208, typically by a hard-wired bus, well known in the art and omitted from the figures for clarity. Location information is provided to the computer 208 by a navigation system 210. In the embodiment shown, the CPU 208 is coupled to a separate processor that controls the drive train 204. The drive train 204 is considered herein to any device that provides motive power. Drive train includes gasoline and diesel internal combustion engines, electric motors and various types of power transmissions. Commands that can be issued to the drive train 204 by the CPU 208 include an inhibit instruction, the function of which is to inhibit vehicle movement but not its other functionality if fuel in the tank 206 is insufficient to reach at least one fuel station that is within the driving range provided by the fuel remaining in the tank 206. In another embodiment, signals sent to the drive train 204 by the CPU 208 control the operation of the drive-train to maximize fuel economy in order to facilitate or enable the vehicle 200 reaching the nearest fuel station.

Not visible in FIG. 2 is the display device 114 described above because such a device is typically located where it is visible to the operator, i.e., inside the vehicle. As described above, the display device for the vehicle 200 is configured to display a warning message when fuel remaining in the tank 206 is depleted to an amount that is insufficient to reach a fueling station closest to where the vehicle is currently located. In an alternate embodiment, an audible warning can also be provided.

As described above, a two-way radio communications device 116 automatically transmits one or more emergency messages when fuel in the tank 206 is depleted or nearly depleted. Similarly, an emergency message can be transmitted when fuel in the tank 206 is insufficient to reach a destination or the nearest fuel station. Information in the transmitted messages preferably includes information as to where the vehicle is currently located in order to notify an emergency services provider where help might be needed.

FIG. 3 is a flow chart depicting a pro-active, low fuel warning method. The method shown in FIG. 3 can be practiced by the structure depicted in FIG. 1 and used in the vehicle depicted in FIG. 2.

In step 304, the CPU 102 determines how much fuel remains in a fuel tank 106 or the amount of energy remaining in a storage battery by reading information from the fuel level sensor 104. Once the amount of fuel that remains is determined, at step 306 the CPU 102 determines the vehicle's current fuel efficiency. The vehicle's maximum driving range is determined by the CPU at step 308 by a straight forward multiplication of the remaining fuel level by the fuel efficiency. After the maximum fuel range is determined, at step 310 the CPU queries the navigation system 108 for the vehicle's current location. After the vehicle's location is determined at step 310, the CPU queries the navigation system for fueling stations within the driving range that was calculated at step 308. A list of fueling stations within the driving range is obtained in step 312.

At step 314, the CPU 102 makes a decision as to whether any fueling station is within the calculated driving range, i.e., the driving range determined by the CPU to be available or provided by the fuel remaining in the vehicle's reservoir. If one or more fueling stations are within the calculated driving range, the "yes" branch of decision step 314 is taken. At step 322, the CPU checks if the remaining fuel amount, i.e., the driving range, exceeds the distance to the nearest fueling station by a driving distance "threshold" extra distance, also referred to herein as a fuel-range safety factor, such as ten percent. By way of example, if the distance to the nearest fueling station as determined by the navigation system is ten miles and the driving range provided by the remaining fuel is determined to be exactly ten miles, there is no margin of error or fuel-range safety factor in the vehicle's driving range to the nearest fueling station. If such a condition exists, the vehicle should proceed directly to the nearest fueling station. At step 323, the navigation system displays directions and/or a map to one or more fueling stations within the driving range provided by the remaining fuel. If the distance to the nearest fueling station as determined by the navigation system is ten miles and the remaining fuel driving range is say, fifteen miles, there exists a driving fuel range safety factor of five miles, which is also fifty percent.

An "alert threshold" at step 323 is an amount of remaining fuel in the vehicle, i.e., a fuel range safety factor, below which the CPU determines that there is an immediate need to warn the driver of an impending low fuel condition. The alert threshold is preferably determined iteratively with the threshold being recalculated according to changes in fuel efficiency, which can be due to the vehicle's speed, road or terrain changes and the like Examples of a fuel range safety factor include five percent, ten percent, twenty percent, thirty percent and all values in between.

When the amount of fuel remaining in the vehicle's reservoir is determined to be below an Alert Threshold, the CPU displays driving directions or a map to one or more fueling stations within the range provided by the remaining fuel. The displayed information about a fueling station includes fueling station addresses, driving directions, a map and the name of the station or brand of fuel offered. Once the fueling station information is displayed, at step 322 program control returns to normal driving 324. Then the CPU periodically loop to monitoring the fuel status again.

If at step 314 the CPU determines that there are no fueling stations within the vehicle's driving range, the CPU provides a low fuel advisory. A low fuel advisory can be provided If the vehicle is not moving, i.e., stopped or parked, and the remaining fuel is insufficient to reach at least one refueling station, the vehicle's operation is inhibited in step 318. Inhibiting the vehicle's operation can be limited to inhibiting the transmission from moving the car. In an alternate embodiment, inhibiting the vehicle can inhibit the engine from even starting.

An emergency message is transmitted in step 318. The emergency message is preferably sent to a predetermined recipient. The recipient can be user-specified, vehicle-owner specified or vehicle manufacturer specified. In a preferred embodiment, the emergency message includes at least the location of the vehicle in the form of an address or geographic coordinates.

If after determining that there are no refueling stations within the driving range provided by the fuel remaining in the reservoir and the vehicle is moving, the CPU generates and causes the display or other communication of a driver advisory, telling the driver to stop the vehicle. The aforementioned emergency message is transmitted, preferably after the vehicle has been stopped but in an alternate embodiment, the emergency message is transmitted even if the vehicle continues to be driven. After the emergency message is transmitted in step 319, program control returns to the starting point 302 after the message is transmitted.

In a preferred embodiment, the display device 114 is embodied as a dash board-mounted liquid crystal display panel. Alternate embodiments of the display device 114 include light emitting diode displays, plasma displays or cathode ray tubes. The "display" can also optionally be embodied as a computer-generated voice message output from an existing audio system or a dedicated speaker.

In a first embodiment, the two-way radio frequency communications device 116 is embodied as an On-Star® system however. In other embodiments, the two-way radio frequency communications system 116 includes cellular, telephone and equivalents thereof but can also include a packetized data communications device that is usable with wireless wide-area local area networks that are commonly referred to as WLANs.

In a first embodiment, the proactive low-fuel warning system is configured for operation with liquid fuels that include diesel, gasoline and alcohol. In another embodiment, the system is configured for use with gaseous fuels that include propane, natural gas and hydrogen gas. In yet another embodiment, the fuel is battery capacity with the fuel tank 106 actually being embodied as one or more storage batteries and the level sensor 104 being embodied as a battery life indicator. Fuel tanks and batteries are considered herein to be fuel reservoirs. A fueling station for a battery-powered car is considered to be one wherein batteries can be recharged or replaced. A fueling station for a liquid-fueled or gaseous-fueled vehicle is considered to be a location where the fuel can be obtained and added to the vehicle's tank.

The foregoing description is for purposes of illustration only. The true scope of the invention is set forth in the appurtenant claims.

What is claimed is:

1. A system for a vehicle, the system comprising:
   a fuel sensor determining fuel remaining in a reservoir;
   a navigation system, having a database of fueling stations; and
   a processor coupled to the fuel sensor and the navigation system, the processor being configured to:
      determine from the navigation system, the database, and a fuel efficiency of the vehicle, whether an amount of fuel remaining in the vehicle is sufficient to reach a fueling station;
      determine whether a distance to the fueling station exceeds a user-specified fuel-range safety factor; and
      control operation of the vehicle, responsive to a determination that the distance to the fueling station exceeds the user-specified fuel-range safety factor.

2. The system of claim 1, wherein the fuel is comprised of battery capacity.

3. The system of claim 1, wherein the processor is configured to control vehicle speed to maximize fuel efficiency to facilitate reaching at least one fueling station.

4. The system of claim 1, further comprising a user interface, configured to display on a display device, information as to the location of a fueling station within a distance reachable with the fuel remaining in the reservoir and, display a speed required to facilitate reaching the fueling station with the remaining fuel.

5. The system of claim 1, further comprising a radio frequency communication system coupled to the processor, the communication system being configured to transmit a predetermined message when fuel in the reservoir is substantially depleted.

6. The system of claim 1, further comprising a radio frequency communication system coupled to the processor, the communication system being configured to transmit a user-determinable message when fuel in the reservoir is substantially depleted.

7. The system of claim 1, further comprising a two-way radio frequency communication system coupled to the processor, the communication system being configured to transmit a message when fuel in the reservoir is less than a first threshold.

8. The system of claim 1, further comprising a two-way radio frequency communication system coupled to the processor, the communication system being configured to transmit a message that includes vehicle location information.

9. The system of claim 8, wherein the vehicle location information is comprised of at least one of:
   latitude and longitude; and
   an address.

10. A low fuel warning system for a vehicle, the system being comprised of:
    a processor; and a memory device coupled to the processor, the memory device storing executable program instructions, which when executed cause the processor to:
  determine whether an amount of fuel remaining in the vehicle is sufficient to reach at least one fueling station, the determination of whether an amount of fuel is sufficient to reach at least one fueling station being responsive to whether the distance to the fueling station exceeds a user-specified fuel-range safety factor; and
  control operation of the vehicle to facilitate the vehicle reaching the fueling station.

11. The low fuel warning system of claim 10, wherein the memory device stores additional program instructions, which when executed cause the processor to display on a display device, information as to the location of a fueling station within a distance reachable with the fuel remaining in the reservoir.

12. The low fuel warning system of claim 10, further comprised of a radio frequency communications device coupled to the processor, and wherein the memory device stored program instructions, which when executed cause the communications device to transmit a message regarding status of the vehicle responsive to a determination that the amount of fuel remaining is insufficient to reach a fueling station.

13. The low fuel warning system of claim 12, wherein the status of the vehicle is comprised of at least one of:
  the fuel remaining in the vehicle; and
  the location of the vehicle.

14. A method of pro-actively warning of a low fuel condition in a vehicle, the method comprising:
  determining an amount of fuel remaining in a fuel reservoir;
  determining a fuel efficiency of the vehicle;
  calculating a driving range provided by the remaining fuel and fuel efficiency;
  determining a location of the vehicle and a distance to a fueling stations statically and while vehicle is moving;
  comparing the distance to a user-specified fuel range safety factor; and
  displaying a low fuel-related message on a display device, when the distance to a fueling station exceeds the user-specified fuel range safety factor, the low fuel-related message comprising a driving speed to facilitate reaching the fueling station with the remaining fuel.

15. The method of claim 14, further comprising the step of inhibiting the vehicle from moving.

16. The method of claim 14, further comprising the step of preventing the vehicle from being started.

17. The system of claim 16, wherein the transmitted message is comprised of a location of the vehicle.

18. The method of claim 14, wherein the fuel range safety factor is between about five percent and thirty percent of a driving range provided by fuel remaining in a vehicle reservoir.

19. The system of claim 14, wherein the low fuel related message is comprised of at least one of:
  a driving range provided by the fuel remaining in the fuel tank;
  a driving practice required to reach a fueling station with the remaining fuel;
  a map route to a fueling station;
  directions to a fueling station; and
  a message that vehicle operation is changed due to a low fuel condition.

20. The system of claim 14, further comprising the step of transmitting a message upon the determination of a low fuel condition.

21. The method of claim 20, wherein the step of obtaining information form a navigation system is comprised of obtaining location information from at least one of:
  a global positioning system;
  an inertial navigation system; and
  a LORAN system.

22. The system of claim 14, further comprising the step of changing vehicle operation upon a determination of a low fuel condition.

23. The method of claim 14, wherein the step of determining a location of the vehicle and a distance to a fueling stations, is comprised of obtaining information from a navigation system.

* * * * *